United States Patent
Kuo et al.

(10) Patent No.: US 11,366,469 B2
(45) Date of Patent: Jun. 21, 2022

(54) MICRO AUTONOMOUS VEHICLE WITH EXCHANGEABLE UTILITY PODS

(71) Applicant: Ford Global Technologies, LLC, Dearborn, MI (US)

(72) Inventors: James Kuo, Farmington Hills, MI (US); Joseph Ian Halaszynski, Farmington Hills, MI (US); Edmund He, Troy, MI (US); Chelsia Ka Po Lau, Ann Arbor, MI (US); Quran Buchanan, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 469 days.

(21) Appl. No.: 16/572,930

(22) Filed: Sep. 17, 2019

(65) Prior Publication Data
US 2021/0080953 A1   Mar. 18, 2021

(51) Int. Cl.
*G05D 1/00*       (2006.01)
*B60P 7/08*       (2006.01)
(Continued)

(52) U.S. Cl.
CPC ........... *G05D 1/0088* (2013.01); *A61G 3/061* (2013.01); *B60J 5/062* (2013.01); *B60K 1/04* (2013.01);
(Continued)

(58) Field of Classification Search
CPC ......... G05D 1/0088; G05D 2201/0212; A61G 3/061; B60J 5/062; B60K 1/04;
(Continued)

(56) References Cited

U.S. PATENT DOCUMENTS

| 2012/0275889 A1* | 11/2012 | Hoppel | A01D 42/00 |
| | | | 414/528 |
| 2014/0250653 A1* | 9/2014 | Droste | H01M 10/44 |
| | | | 29/729 |

(Continued)

FOREIGN PATENT DOCUMENTS

WO       2018156118 A1    8/2018

OTHER PUBLICATIONS

E. Royer et al. "Lessons Learned After More Than 1000 KM in an Autonomous Shuttle Guided by Vision" (Nov. 2016) pp. 2248-2253.

*Primary Examiner* — Richard M Camby
(74) *Attorney, Agent, or Firm* — Brandon Hicks; Eversheds Sutherland (US) LLP

(57) ABSTRACT

An autonomous vehicle includes an autonomously driven vehicle frame with a retractable pivot mechanism disposed on a platform surface of the vehicle frame. Changeable utility pods are configured to attach to and be removed from the vehicle frame by way of the retractable pivot mechanism onboard the frame, and autonomously change the vehicle from a passenger transport to a logistics transport by changing utility pods. A processor provides autonomous vehicle operations that include extending the retractable pivot mechanism from a retracted position recessed in the platform surface of the vehicle frame to an extended position that engages a utility pod conveyor channel. The retractable pivot mechanism engages a conveyor channel disposed on a mating surface of a utility pod, and conveys the utility pod along the conveyor channel to a centered and laterally-aligned position on the vehicle frame by rotating the pod into position once centered over the pivot mechanism.

20 Claims, 15 Drawing Sheets

(51) Int. Cl.

| | |
|---|---|
| *B60K 1/04* | (2019.01) |
| *B60L 50/60* | (2019.01) |
| *B60J 5/06* | (2006.01) |
| *B60P 3/00* | (2006.01) |
| *B60P 1/64* | (2006.01) |
| *B60P 1/54* | (2006.01) |
| *A61G 3/06* | (2006.01) |
| *B60S 1/04* | (2006.01) |
| *E05B 83/00* | (2014.01) |
| *G07C 9/00* | (2020.01) |
| *B60P 3/42* | (2006.01) |
| *B60N 2/24* | (2006.01) |

(52) U.S. Cl.
CPC ................ *B60L 50/66* (2019.02); *B60P 1/54* (2013.01); *B60P 1/6418* (2013.01); *B60P 3/007* (2013.01); *B60P 3/423* (2013.01); *B60P 7/08* (2013.01); *B60S 1/04* (2013.01); *E05B 83/00* (2013.01); *G07C 9/00912* (2013.01); *B60N 2/24* (2013.01); *G05D 2201/0212* (2013.01)

(58) Field of Classification Search
CPC ........ B60L 50/66; B60L 50/60; B60L 3/0015; B60L 2200/24; B60L 2240/622; B60L 2260/32; B60P 1/54; B60P 1/6418; B60P 3/007; B60P 3/423; B60P 7/08; B60P 3/00; B60S 1/04; E05B 83/00; G07C 9/00912; G07C 5/008; G07C 9/00571; G07C 9/00944; G07C 9/00896; B60N 2/24; Y02T 10/70; Y02T 10/72; Y02T 90/16; B62D 63/04; B62D 47/006

See application file for complete search history.

(56) References Cited

U.S. PATENT DOCUMENTS

| | | | |
|---|---|---|---|
| 2016/0311478 A1 | 10/2016 | Amiri | |
| 2017/0225601 A1* | 8/2017 | Borders | ................ B60P 1/6418 |
| 2018/0118174 A1* | 5/2018 | Moskowitz | ............ B60L 50/66 |
| 2019/0143872 A1* | 5/2019 | Gil | ...................... B65G 1/0421 |
| | | | 211/86.01 |

* cited by examiner

MICRO AUTONOMOUS VEHICLE WITH EXCHANGEABLE UTILITY PODS

TECHNICAL FIELD

The present disclosure relates to autonomous vehicles, and more particularly, to an autonomous vehicle with an exchangeable utility pod.

BACKGROUND

In recent years, autonomous vehicles have been developed to transport individuals, mainly their respective owners. To guide movement of these autonomous vehicles along designated routes for personal transportation, such autonomous vehicles typically utilize sensors in conjunction with map databases to maneuver/navigate along roads and traffic, and around other objects.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
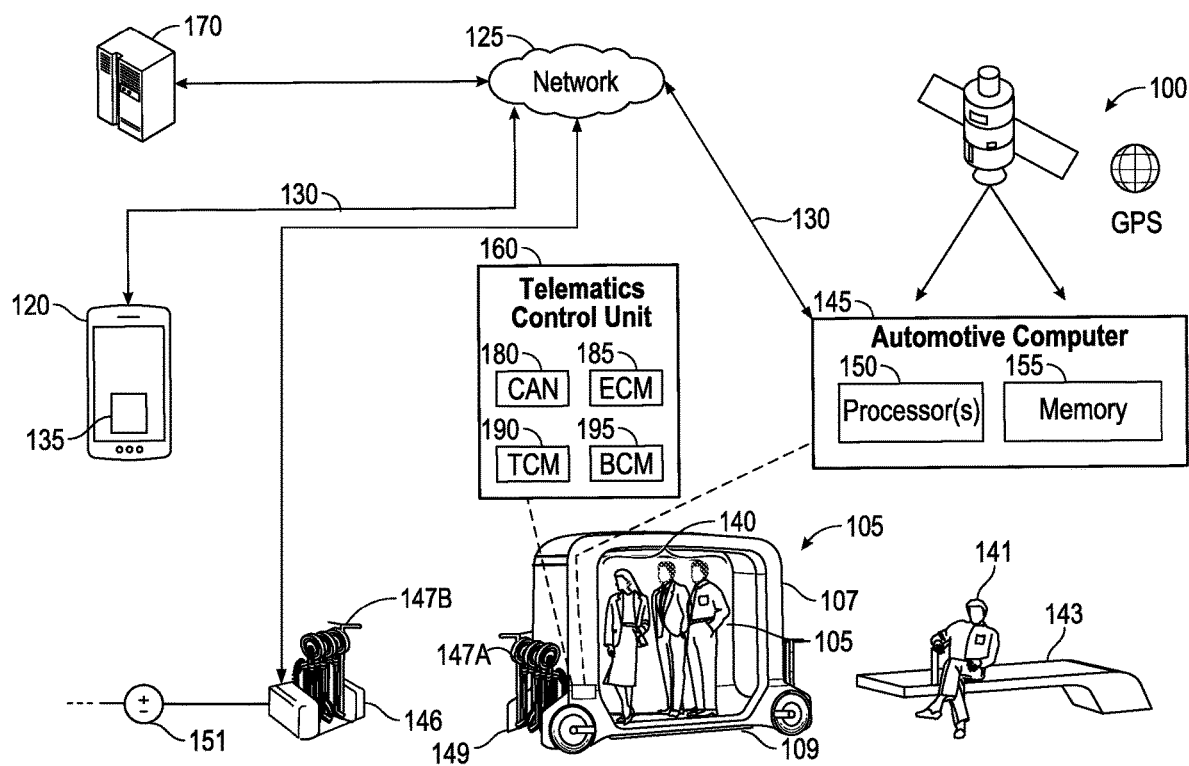
FIG. 1 depicts an example computing environment in which techniques and structures for providing the systems and methods disclosed herein may be implemented.

The systems and methods disclosed herein are configured to provide last-mile transport vehicles and systems for use in high-density population areas such as, for example, a city center or other urban environment. Because public transportation vehicles, even when configured as autonomous transportation systems, may not be fully utilized during off-peak hours, it is advantageous to provide systems and infrastructure that can seamlessly switch vehicle equipment of autonomous vehicles using a pod-based delivery system that configures the vehicles according to real-time demand requirements. Embodiments of the present disclosure describe compact transport mechanisms that may be operable within a bicycle lane, and provide last-mile transportation and logistics using autonomous systems in areas that may be otherwise limited due to vehicle size and other constraints associated with conventional vehicles.

For example, the present disclosure describes an autonomous vehicle (AV) that may be operable as part of a fleet of AVs. The AV may be independently operable, comprising an AV frame that can operate with or without a changeable cargo/cabin area, described in the present disclosure as a removable utility pod. The utility pods may be configured in different ways according to demand, such as a standing passenger cabin for transporting people during peak transportation hours, and as a cargo hold for performing last-mile cargo delivery services during off-peak hours. The removable utility pod may further include other equipment or configurations, such as a work-tool enabled utility machine that performs robotic tasks during times when the vehicles are not being used for public transport. The AV vehicle frame is self-driving and operates independently from the pod installed on the AV. The utility pods may include an auxiliary battery pack that can provide an additional or supplementary power source for the AV.

The removable pod is configured with waste management equipment and storage areas, where the autonomous vehicle can operate in narrow alleyways and other space-limited areas to exchange full refuse bins with empty bins.

The present disclosure includes an autonomously driven vehicle frame configured with a removable pod that is a storage locker in which online purchases may be securely stored until retrieval by authorized users. The removable pod may be transported by the autonomous vehicle to a stationary location that includes a public fixture that may double as a bench seat when not used to support a storage locker. The utility pod can be a deliverable storage locker for storing online consumer purchases for pickup, where the storage locker may be loaded with items at a warehouse and delivered to a central item pickup site.

The present disclosure describes features associated with the autonomous vehicles and utility pods that provide visual indications to pedestrians, bicyclists and other individuals, that can signal an acknowledgement by the autonomous vehicle that the vehicle sees or senses the pedestrian or bicyclist. For example, as a pedestrian or bicyclist approaches a lateral side of the autonomous vehicle (AV), the AV may use a laser light system to signal markings on the pavement surrounding the AV that indicates that the AV is aware of the pedestrian or bicyclist. An example indication may be a lighted arrow marker that follows the moving position of the bicyclist.

Other uses such as service or food delivery, etc. are possible, and such uses are contemplated.

The vehicle frame may include mechanisms for autonomously exchanging the utility pods from other pod-carrying vehicles to the AV. For example, the present disclosure can include an AV frame having a retractable pivot mechanism disposed on a platform surface of the vehicle frame. The removable utility pod is configured to convey to and from the vehicle frame by way of the retractable pivot mechanism. In some aspects, a processor-driven vehicle controller may be configured to provide AV operation, and carry upon the vehicle frame only the exterior "shell" that may be configurable according to the desired use at the moment.

The controller may include a memory for storing executable instructions that, when executed, cause extension of the retractable pivot mechanism from a retracted position, where the mechanism is recessed to be generally flush with the platform surface of the vehicle frame, to an extended position that extends the mechanism above the platform surface such that it can engage a mating channel in a utility pod. The controller may then actuate the retractable pivot mechanism such that rotating members disposed around a periphery of the mechanism engage edges of a conveyor channel of the removable utility pod. The rotating members of the retractable pivot mechanism may be, for example, independently controlled and actuated drive wheels (or gears) that convey the utility pod along the conveyor channel by engaging edges of the utility pod channel, and convey the utility pod with lateral movements and/or rotational movements with respect to an axial position of the retractable pivot mechanism. Once the utility pod is conveyed to a latitudinally centered position of the platform surface of the vehicle frame, with respect to the pivot mechanism, the pivot mechanism may then axially pivot the utility pod such that the utility pod is generally aligned along a longitudinal centerline of the vehicle frame. The autonomous vehicle may then lock the utility pod to the vehicle frame for operational use for transporting people, equipment, materials, cargo, and other possible uses.

The AV may further contain on board the vehicle a plurality of personal transport vehicles that operate as part of a personal transport vehicle fleet. The personal transport vehicles may be electric scooters that can be immediately available for onboard passengers to rent as an additional service or as part of a rideshare subscription. Accordingly, the passengers may rent the personal transport vehicles as they exit the AV, which was concurrently configured for people transport. In another aspect, the dispensing rack for the personal transport vehicles may be removable from the AV to a stationary charging rack fixture offboard the AV.

The AV may dispense and/or otherwise store the personal transport vehicles on an exterior dispensing rack of the AV, where passengers may view them as they exit the AV and request access to one or more of the scooters using a mobile device application or via other means for authenticating access. The AV may cause the storage rack to release a personal transport vehicle, which may be foldable or otherwise made compact for multiple device storage, where the user may continue on the next leg of their journey independently using the personal transport vehicle.

According to other aspects as described herein, the utility pods may further include self-cleaning sensor bank mechanisms that may wipe away debris and moisture from the outside surface of the sensor bank.

Described embodiments may provide a flexible AV system that provides maximized use of autonomous vehicle infrastructure that can accommodate peak transportation demand when people desire transportation, and may further accommodate off-peak demand for providing infrastructure support such as last-mile delivery, waste management, and other utilities. Passenger only pods may benefit from isolation from smells, soil, and visible wear associated with utility cargo areas, because passenger utility pods may be used for personnel-transport purposes, then removed to allow the AV to function at other times as a utility vehicle.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 depicts an example computing environment 100 that can include an autonomous vehicle 105 (hereafter "AV 105"), an automotive computer 145, a telematics control unit (TCU) 160, and a mobile device 120. The mobile device 120 may be communicatively coupled with the AV 105 via one or more network(s) 125, which may communicate via one or more wireless channel(s) 130. The mobile device 120 may include one or more application(s) 135.

The AV 105 may include an AV frame 109, and a removable utility pod 107, which may be configurable in various ways according to a desired use. In the example of FIG. 1, the utility pod 107 is configured as a personnel transport capsule that includes a passenger compartment 140 that is separable from the AV vehicle frame 109 when not needed for personal transportation. In another aspect, the AV frame 109 may be configured to receive a different utility pod (not shown in FIG. 1) that configures the AV for other uses, such as cargo transport, delivery of utility services, etc. Although the removable utility pod 107 is depicted as a personal transport pod, it should be appreciated that the removable utility pod 107 may be configurable in various ways, described in accordance with embodiments throughout this disclosure.

One such possible configuration of a utility pod is as a plurality of lockable storage bins that can be delivered to a stationary fixture 143 by the AV 105. The example stationary fixture 143 depicted in FIG. 1 may be usable as a bench seat when not in use as a storage bin fixture. A pedestrian 141 is depicted sitting on the empty stationary fixture 143.

The utility pod 107 is configured as a personnel transport capsule, as shown in FIG. 1. In an embodiment, a group of users (collectively, users 140) are shown riding in a standing position within a passenger compartment 140.

The AV 105 may include an automotive computer 145, which may include one or more processor(s) 150 and memory 155. The AV 105 may further include a Telematics Control Unit (TCU) 160, which may be disposed in communication with and/or be a part of the automotive computer 145. The TCU 160 may, in some example embodiments, be disposed in communication with the mobile device 120, and one or more server(s) 170, which may be associated with and/or include a Telematics Service Delivery Network (SDN) (not shown in FIG. 1). The AV 105 may also receive and/or be in communication with a Global Positioning System (GPS) 175. The TCU 160 and automotive computer 145 are depicted as part of the AV frame 109. It should be appreciated that the TCU 160 and/or the automotive computer 145 may also be disposed in and/or communicatively coupled with the utility pod 107.

In one example embodiment, the user 140 may control the one or more application(s) 135 (hereafter the application 135") operating on the mobile device 120 to perform aspects of the present disclosure. For example, the AV 105 may include a personal transport vehicle charging rack 147A configured to removably store and charge one or more personal transport vehicles 149. One example personal transport vehicle is an electric scooter. Other types of personal transport vehicles are possible, including, for example, electric bicycles, hover boards, self-balancing two-wheeled transportation vehicles, etc., and such configurations are contemplated, although not to be construed as limiting.

In another aspect, the personal transport vehicle charging rack 147A may be removable from the AV to a stationary charging rack fixture 146 (offboard the AV) as shown in FIG. 1. Accordingly, the stationary charging rack fixture 146 may provide a stationary charging location where users may pick-up charged personal transport vehicles, and deposit vehicles that need to be charged.

In one example embodiment, the personal transport vehicle charging rack 147B may include a wirelessly connected controller (not shown in FIG. 1) in communication with the server(s) 170 via the network(s) 125, and may include a power source 151 for charging the vehicles on the rack.

In some aspects, the mobile device 120 may communicate with the AV 105 and/or the personal transport vehicle charging racks 147A, 147B through the one or more channel(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the AV 105. The transmitter may communicate with the mobile device 120 using a wireless communication network such as, for example, the one or more network(s) 125. The wireless channel(s) 130 are depicted in FIG. 1 as communicating via the one or more network(s) 125.

The one or more network(s) 125 illustrate an example of one possible communication infrastructure in which the connected devices may communicate. The one or more network(s) 125 may be and/or include the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The TCU 160 can include communication and control access to a plurality of vehicle computing modules such as, for example, a Controller Area Network (CAN) bus 180, one or more Engine Control Modules (ECMs) 185, a Transmission Control Module (TCM) 190, and/or a Body Control Module (BCM) 195. Control and/or communication with other control modules not shown is possible, and such control is contemplated. In some aspects, the TCU 160 may control aspects of the AV 105 through the control modules 180-195 and implement one or more instruction sets received from the application 135 operating on the mobile device 120, and/or received from the server(s) 170 via the wireless channel(s) 130.

The automotive computer 145 may include one or more processor(s) 150 and a computer-readable memory 155. The automotive computer 145 may be installed in an interior compartment of the AV 105 (or elsewhere in the AV 105) as part of an AV control system in accordance with the disclosure. One such AV control system is described in greater detail with respect to FIG. 2. The automotive computer 145 may include, in one example, the processor(s) 150, and a computer-readable memory 155. In other example embodiments, the TCU 160 may be integrated with and/or be incorporated with the automotive computer 145. For the sake of simplicity, the computing system architecture of the automotive computer 145 may omit certain computing modules. It should be readily understood that the computing environment depicted in FIG. 1 is one example of a possible implementation according to the present disclosure, and thus, it should not to be considered limiting or exclusive.

The one or more processor(s) 150 may be disposed in communication with one or more memory devices (e.g., the memory 155 and/or one or more external databases (not shown in FIG. 1). The one or more processor(s) 150 may utilize the memory 155 to store programs in code and/or to store data for performing autonomous vehicle navigation, removing utility pods and installing utility pods, dispensing personal transport vehicles 149, and performing other aspects described in accordance with the disclosure. The memory 155 may be a non-transitory computer-readable memory. The processor(s) 150 may be configured to execute computer-executable instructions stored in the memory 155 for performing various functions of the autonomous vehicle control system (e.g., the control system 200 as depicted with respect to FIG. 2) as well as for performing vehicle control capabilities in accordance with the disclosure. Consequently, the memory 155 may be used for storing code and/or data code and/or data for performing operations in accordance with the disclosure.

The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The memory 155 may be one example of a non-transitory computer-readable medium, and may be used to store programs in code and/or to store data for performing various operations in accordance with the disclosure. The instructions in the memory 155 can include one or more separate programs, each of which can include an ordered listing of computer-executable instructions for implementing logical functions. In another exemplary implementation, some or all components of the automotive computer 145 may be shared with the TCU 160.

The memory 155 may store various code modules such as, for example, a secure communication controller (not shown in FIG. 1) for establishing the one or more channels 130 (which may, in some embodiments, be encrypted channel(s)) between the mobile device 120, the TCU 160, and/or the automotive computer 145.

Figure 2:
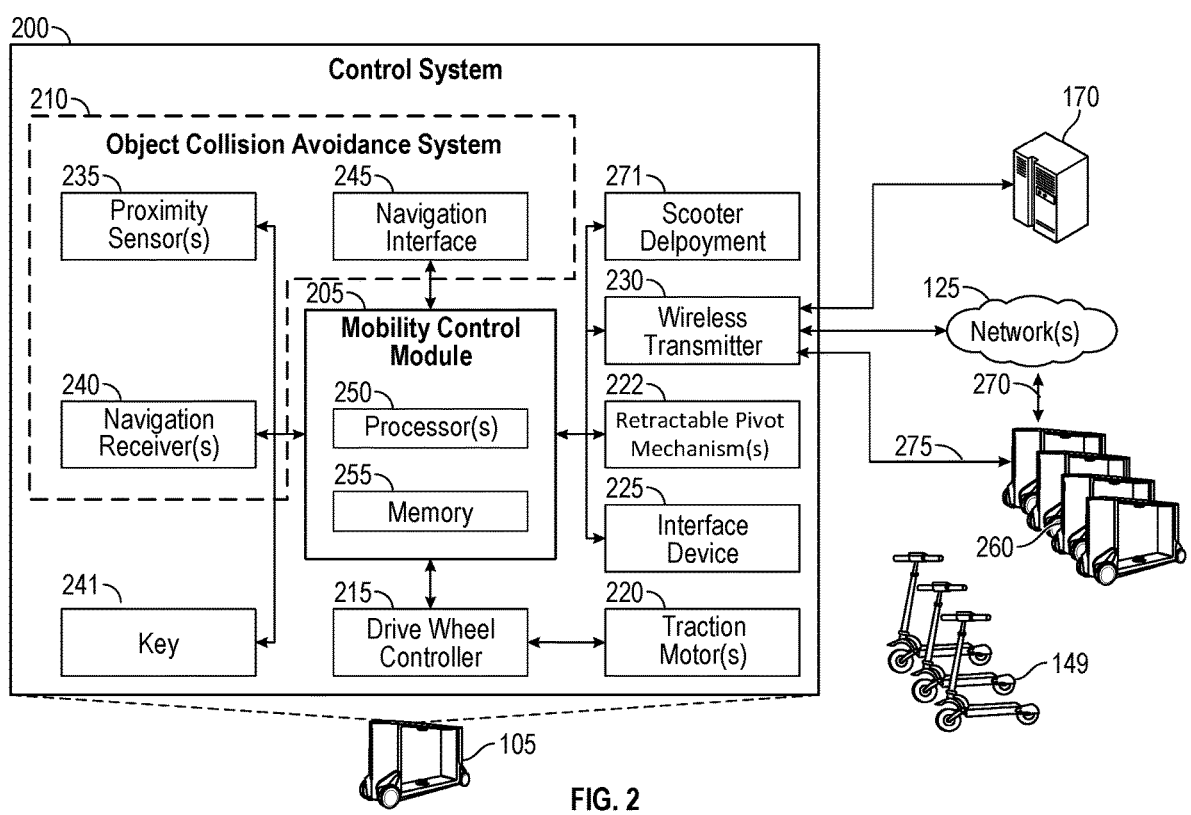
FIG. 2 depicts a block diagram of an example control system for an autonomous vehicle in accordance with the present disclosure.

FIG. 2 depicts a block diagram of an example control system 200 for an autonomous vehicle such as, for example, the AV 105 depicted in FIG. 1. The example control system 200 may include an object collision avoidance system 210, a mobility control module 205, configured to receive data from an object collision avoidance system 210, and a drive wheel controller 215. The drive wheel controller 215 may be disposed in communication with the mobility control module 205, one or more traction motor(s) 220, and one or more retractable pivot mechanism(s) 222 in communication with the drive wheel controller 215. An interface device 225 may be in communication with the object collision avoidance system 210 via the mobility control module 205. The object collision avoidance system 210 may communicate one or more control signals to a fleet control platform (not shown in FIG. 2) operable on the server(s) 170 via a wireless transmitter 230.

The object collision avoidance system 210 may include one or more proximity sensor(s) 235, one or more navigation receiver(s) 240, and a navigation interface 245 through which users of the AV 105 may interact with the vehicle, request a start, stop, voice command, request access to the personal transport vehicle 149, etc. The mobility control module 205 may communicate with the drive wheel controller 215 and transmit one or more signals for control of the one or more traction motor(s) 220. The mobility control module 205 may further include a key 241, which may be configured to activate an operation of the AV 105.

The key may be a physical key or may be an identification code or a password entered by a user via a touch screen interface (e.g., the interface device 225). The identification code may be associated with a service provider who rents a personal transport vehicle 149, an individual owner of the AV 105, a subscriber to multiple vehicles in a fleet associated with the service provider, etc. In one aspect, the mobility control module 205 may generate instructions to a scooter deployment module 271 configured to actuate locking and unlocking mechanisms that release personal transport vehicle 149 when an authenticated user requests the vehicle.

The control system 200 may communicate with one or more other AVs in a vehicle fleet 260 in various ways, including via an indirect communication channel 270 using the network(s) 125, and/or via a direct communication channel 275 that connects one or more of the AVs in the fleet 260 via a direct vehicle-to-vehicle connection.

The mobility control module 205 may include one or more processor(s) 250, and a memory 255, which may be substantially similar or identical to the automotive computer 145 described with respect to FIG. 1.

The object collision avoidance system 210 may provide route management and communication between one or more other AVs in the vehicle fleet 260. The object collision avoidance system 210 may receive sensor input and user 140 input via the navigation interface device 225 to receive user selections indicative of starting, stopping, instructions for tasks, etc., while interacting with the AV 105. The mobility control module 205 may receive navigational data from the navigation receiver(s) 240 and the proximity sensor(s) 235, determine a navigational path from a first location to a second location, and provide instructions to the drive wheel controller 215 for autonomous, semi-autonomous, and/or manual operation.

The AV 105 may operate on a predetermined route within a geo-bound region, where the route includes the task of performing personal transport during a predetermined set of hours (e.g., during daytime hours, rush hour, etc.). In other aspects, the navigation receiver(s) 240 may navigate along the predetermined route similar to a conventional public transportation vehicle schedule. In other aspects, the AV 105 may be configured to exchange the utility pod 107 using onboard actuation mechanisms (described in embodiments hereafter), and navigate to other routes. The object collision avoidance system 210 can provide the route management, and operate in conjunction with global positioning to operate the vehicle on-route and during off-route tasks individually commissioned by a centralized server.

The navigation receiver(s) 240 can include one or more of a global positioning system (GPS) receiver, and/or other related satellite navigation systems such as the global navigation satellite system (GLNSS), Galileo, or other similar systems known in the art of autonomous vehicle operation. Additionally, the navigation receiver(s) 240 can be configured to receive locally based navigation cues to aid in precise navigation through space-restricted areas, such as, for example, in a crowded street, and/or in a distributed beacon environment. When deployed in conjunction with a distributed beacon network (not shown in FIG. 2), locally based navigation cues can include communication with one or more purpose-built location beacons (not shown in FIG. 2) placed throughout a geographic area. The navigation cues may enable an increased level of navigation precision and provide specific indicators for locations of various points of interest. In other aspects, the navigation receiver(s) 240 may include one or more navigation transceivers (not shown in FIG. 2) for communication with mobile network infrastructure for cell tower triangulation and use of known-location Wi-Fi hotspots. Any location technology now known or later developed that can provide a high precision location (e.g., preferably within a foot) can be useful as part of navigation receiver(s) 240.

Figure 4A:
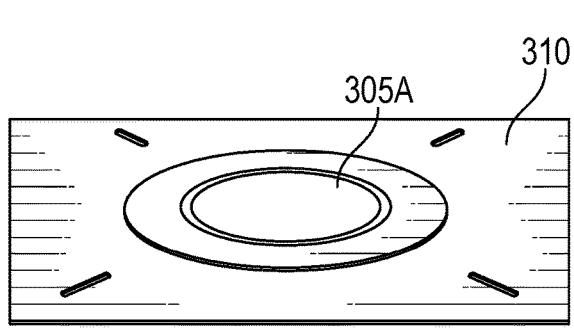
FIG. 4A depicts a retractable pivot mechanism in a retracted position in accordance with an embodiment.
Figure 4B:
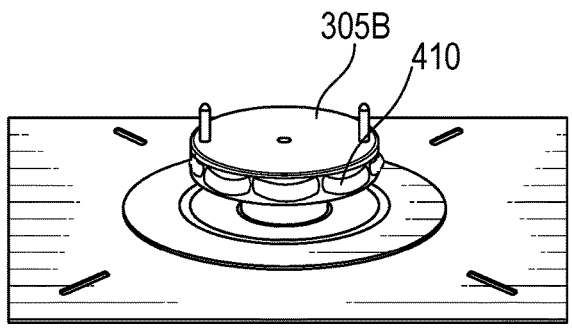
FIG. 4B depicts the retractable pivot mechanism of FIG. 4A in an extended position in accordance with an embodiment.

The proximity sensor(s) 235 may work in connection with the navigation receiver(s) 240 to provide situational awareness to mobility control module 205 for autonomous navigation. For example, the proximity sensor(s) 235 may be configured to determine a relative location of a utility pod (e.g., the utility pod 107 as shown in FIG. 1) with respect to the AV frame 109, extending the retractable pivot mechanism from a retracted position recessed in a platform of the AV frame 109 to an extended position (such extending is depicted in FIGS. 4A and 4B), and engage a conveyor channel of the removable utility pod 107 via the retractable pivot mechanism, to engage a conveyor channel disposed on a mating surface of the utility pod 107.

In some aspects, the sensor(s) 235 may determine whether the utility pod 107 is linearly aligned in a position along a longitudinal centerline of the AV frame 109, and responsive to determining that alignment is made, engage a lock mechanism (not shown in FIG. 2) that rigidly secures the utility pod to the AV frame 109.

In other aspects, the proximity sensor(s) 235 may alert the mobility control module 205 to the presence of sensed obstacles, and provide trajectory information to the mobility control module 205, where the trajectory information is indicative of moving objects or people that may interact with the AV 105.

The wireless transmitter 230 may communicate with one or more other AVs in an AV fleet 260, in a fleet of personal transport vehicles 149, and/or a central routing computer (e.g., the server(s) 170) using a wireless communication network such as, for example, the network(s) 125. The network(s) 125 may be and/or include communication with the Internet, a private network, a cellular telephone provider's data network, or other network infrastructure. The wireless transmitter 230 may communicate directly with one or more other AVs in the fleet vehicles 149 and/or 260 using one or more vehicle-to-vehicle communication protocols via the direct communication channel 275. An example of a vehicle-to-vehicle communication protocol may be, for example, the dedicated short-range communication (DSRC) protocol.

The mobility control module 205 may connect with one or more drive wheel controllers 215, which in turn may operate one or more traction motors 220 for vehicle actuation, navigation, and general operation. The mobility control module 205 may communicate with the drive wheel controller 215 for providing autonomous and/or semi-autonomous navigation to selected points of interest. The drive wheel controller 215 may control one or more drive mechanisms such as, for example, one or more brushless direct current (DC) motors, or another traction motor technology.

Figure 3:
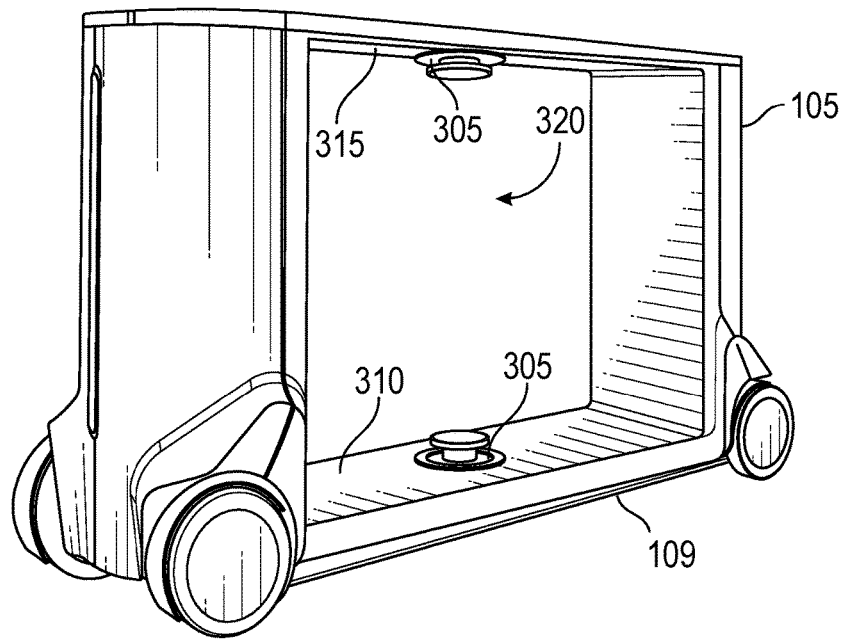
FIG. 3 illustrates one example autonomous vehicle having a set of retractable motor pivot mechanisms in accordance with an embodiment.

FIG. 3 illustrates an example embodiment where the AV 105 includes a set of retractable pivot mechanisms 305 and 306, in accordance with an embodiment. In one aspect, the AV frame 109 may include one or more mechanisms for autonomously exchanging the utility pods from other pod-carrying vehicles to the AV. For example, FIG. 3 depicts the AV frame 109 having upper and lower retractable pivot mechanisms 305 disposed on a platform surface 310, 315 of the vehicle frame 109. The platform surface may include a lower platform surface 310, an upper platform surface 315, or another surface of an interior portion 320 of the AV 105. The removable utility pod 107 (as shown in FIG. 1) is configured to convey to and from the vehicle frame 109 by way of the retractable motor pivot mechanism(s) 305.

The controller may include a memory for storing executable instructions that, when executed, cause extension of the retractable pivot mechanism(s) from a retracted position, where the mechanism is recessed to be generally flush with the platform surface of the vehicle frame, to an extended position that extends the mechanism(s) above the platform surface such that it can engage a mating channel in a utility pod. The controller may then actuate the retractable pivot mechanism such that rotating members disposed around a periphery of the mechanism engage edges of a conveyor channel of the removable utility pod.

The rotating members of the retractable pivot mechanism may be or include independently controlled and actuated drive wheels (or gears) that convey the utility pod along the conveyor channel by engaging edges of the utility pod channel. The rotating members may convey the utility pod with lateral movements and/or rotational movements with respect to an axial position of the retractable pivot mechanism. Once the utility pod is conveyed to a center position of the utility pod with respect to the pivot mechanism, the pivot mechanism may axially pivot the utility pod such that the utility pod is generally aligned along a longitudinal centerline of the vehicle frame. The autonomous vehicle may lock the utility pod to the vehicle frame for operational use, for transporting people, equipment, materials, cargo, and other possible uses.

FIG. 4A depicts the retractable pivot mechanism 305 in a retracted position 305A, in accordance with an embodiment. Accordingly, in the retracted position 305A, the platform surface 310 is generally in a flush position.

Figure 4C:
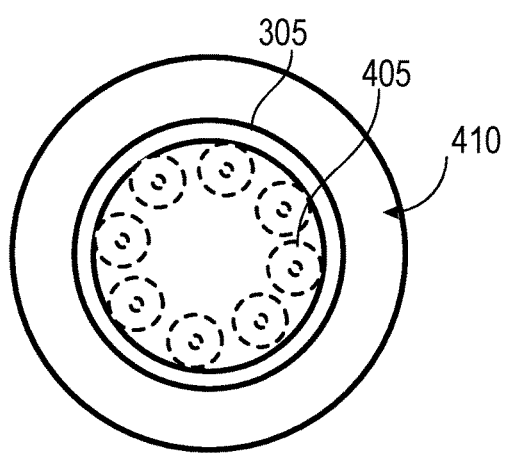
FIG. 4C depicts a top view of the retractable motor pivot mechanism in accordance with an embodiment.

When triggered for use, the AV 105 may cause the retractable pivot mechanism 305 to extend up such that it can engage the edges of a drive channel of a utility pod (not shown in FIGS. 4A-4C). FIG. 4B depicts the retractable pivot mechanism 305 in an extended position 305B, in accordance with an embodiment. A plurality of independently driven actuation members 410 are depicted, with an example actuation member 405 of the plurality of actuation members 410 being discussed in greater detail in FIG. 4D.

FIG. 4C depicts a top view of the retractable motor pivot mechanism 305 having the plurality of independently driven actuation members 410. For example, an actuation member 405 of the plurality of actuation members 410 is depicted in FIG. 4D.

Figure 4D:
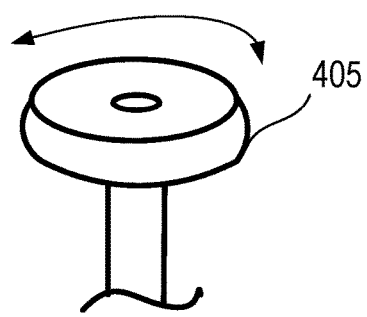
FIG. 4D depicts the actuation member rotation in accordance with an embodiment.

With reference to FIG. 4D, the actuation member 405 may be rotated in either direction using a motor drive (not shown in FIGS. 4A-C) to rotate independent from actuation of any of the other actuation members 410, such that a utility pod (e.g., 107) may be conveyed in any lateral or rotational direction using the conveyor channel of the utility pod. Although shown as having generally round edges, it should be appreciated that the actuation member 405 may have another general profile or shape, and/or may include any method of engagement with a mating member such as a conveyor channel such as gear drive engagement, friction engagement, or another mechanical method. The actuation member 405 may be constructed of rubber, metal, plastic, or another suitable material that can transmit frictional forces sufficient to transmit rotational force from the rotating actuation member 405 to the utility pod.

Figure 5A:
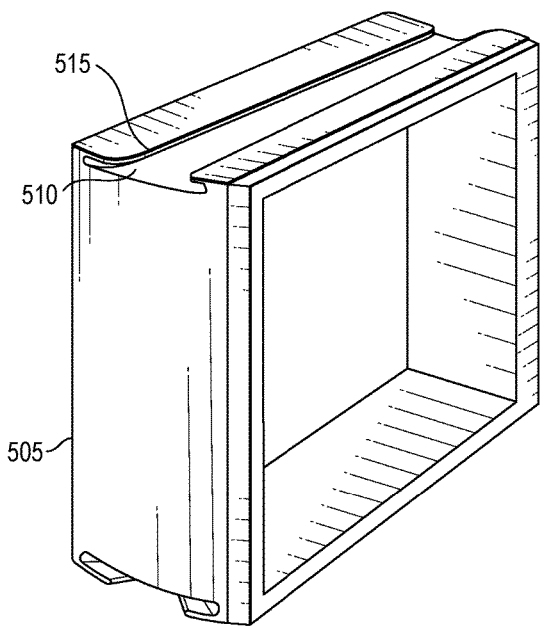
FIG. 5A depicts an example utility pod for transporting personnel or cargo in accordance with an embodiment.

FIG. 5A depicts an example utility pod 505, which may be configured for transporting people or cargo in accordance with an embodiment. The utility pod 505 includes at least one conveyor channel 510 having a plurality of conveyor channel edges 515. Accordingly, the AV 105 may extend the retractable pivot mechanism(s) 305 (as depicted in FIG. 3) from a retracted position 305A recessed in the platform surface 310 of the AV frame 109 to an extended position 305B, and engage the conveyor channel(s) 510 of the removable utility pod via the retractable pivot mechanism(s) to engage a conveyor channel disposed on a mating surface of the utility pod 505.

Figure 5B:
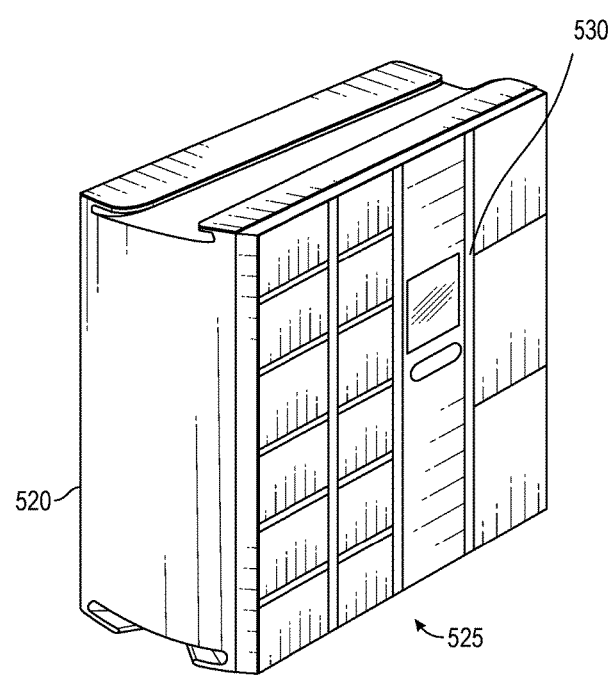
FIG. 5B depicts another example utility pod that includes a plurality of lockable storage bins in accordance with an embodiment.

FIG. 5B depicts another example utility pod 520 that includes a plurality of lockable storage bins 525 in accordance with an embodiment. In one example embodiment, the utility pod 520 may include a storage bin controller 530 having a processor configured to connect with a remote server (e.g., the server(s) 170 as shown in FIGS. 1 and 2), which may connect with and/or host a package delivery platform associated with an e-commerce website. In some embodiments, the storage bin controller 530 may receive user input associated with a user account, where the user account provides authenticated access to lock or unlock a particular bin of the plurality of lockable storage bins 525. For example, the plurality of lockable storage bins 525 may have been loaded with goods at a warehouse, then transported to a stationary fixture (e.g., the stationary fixture 143 as shown in FIG. 1). The storage bin controller 530 may authenticate the user input by way of the remote server(s) 170, and receive, from the remote server(s) 170 an instruction indicative of an access authorization responsive to the authentication of the user input. Accordingly, the storage bin controller 530 may be configured to lock or unlock a locking mechanism (not shown in FIG. 5B) of one or more storage bins based on the instruction. The locking and unlocking provides access to an interior of a storage bin of the plurality of lockable storage bins 525, based on the authenticated user input.

Figure 6:
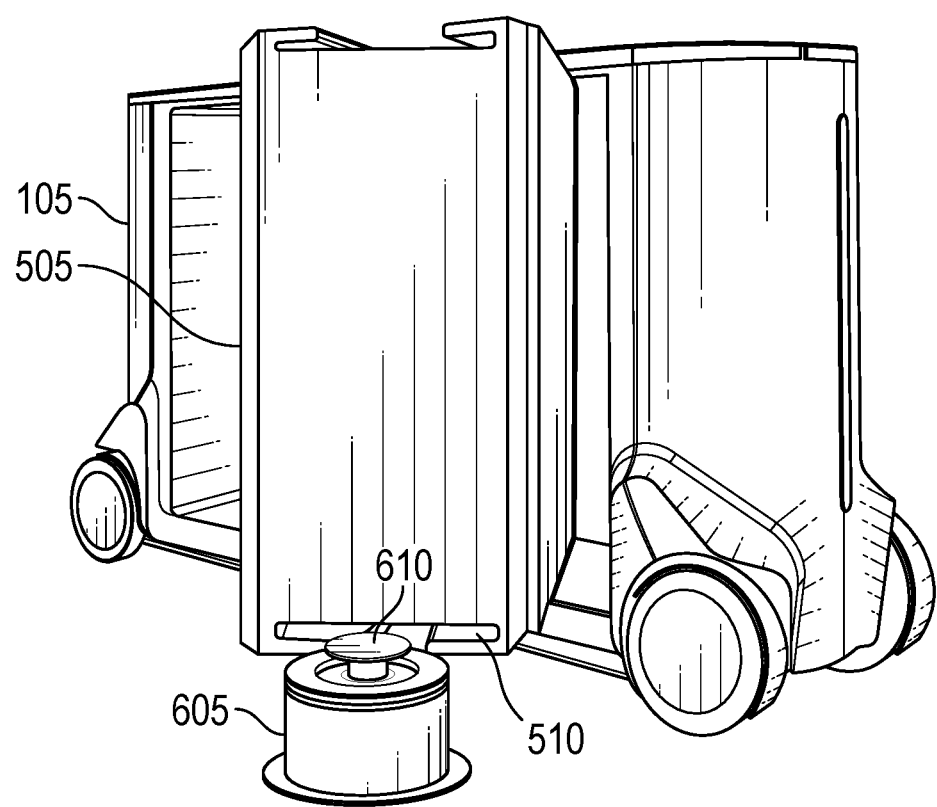
FIG. 6 depicts an autonomous vehicle such as the vehicle depicted in FIG. 1 transferring a utility pod to a stationary docking point in accordance with an embodiment.

FIG. 6 depicts an autonomous vehicle 105 transferring the utility pod 107 to a stationary docking point 605 in accordance with an embodiment. The stationary docking point 605 may include a retractable pivot mechanism 610, which is depicted in an extended position. As described in following embodiments, the AV 105 may rotationally and laterally convey the utility pod 107 using a retractable pivot mechanism (not shown in FIG. 6) located in a platform surface of the AV 105, such that the utility pod 107 may axially rotate at a center point of the utility pod 505 to align the conveyor channel 510 with the retractable pivot mechanism 610. Once aligned, the AV may convey the pod 505 laterally (in line with the conveyor channel 510) to engage the retractable pivot mechanism 610 in the conveyor channel 510. Once engaged, the retractable pivot mechanism 610 may convey the utility pod 505 to an axially centered position.

Figure 7:
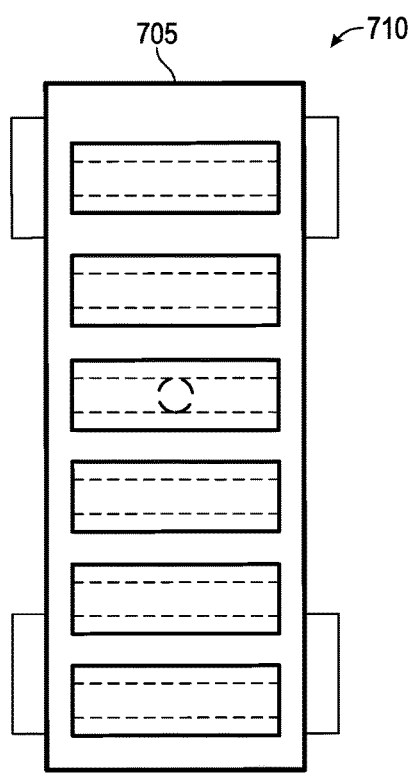
FIG. 7 depicts a utility pod transport vehicle carrying a plurality of exchangeable utility pods for use in autonomous vehicles in accordance with an embodiment.

One advantage of the configuration for AVs described herein, such as, for example, the AV 105, includes the changeability of the utility pods based on real-time demand for the utility of the particular pod. In an example embodiment depicted in FIG. 7, a utility pod transport vehicle 705 (hereafter "transport vehicle 705") may carry a plurality of exchangeable utility pods 710 for use in AVs, in accordance with an embodiment.

Figure 8:
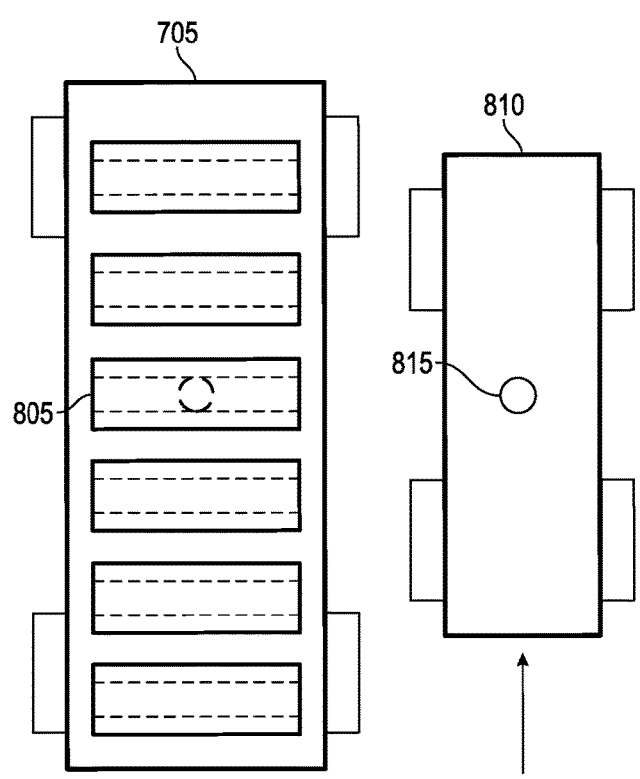
FIG. 8 depicts a first step of a pod exchange where the utility pod transport vehicle transfers a utility pod to an autonomous vehicle in accordance with an embodiment.

FIG. 8 depicts a first step of a pod exchange where the transport vehicle 705 readies a utility pod 805 for transfer to an AV frame 810, in accordance with an embodiment. One or more of the AV frame 810 and the transport vehicle 705 may navigate to a generally aligned position such that the target utility pod for transfer (in this example, the utility pod 805) is aligned for lateral transfer to a retractable pivot mechanism 815 in an extended position onboard the AV frame 810.

Figure 9:
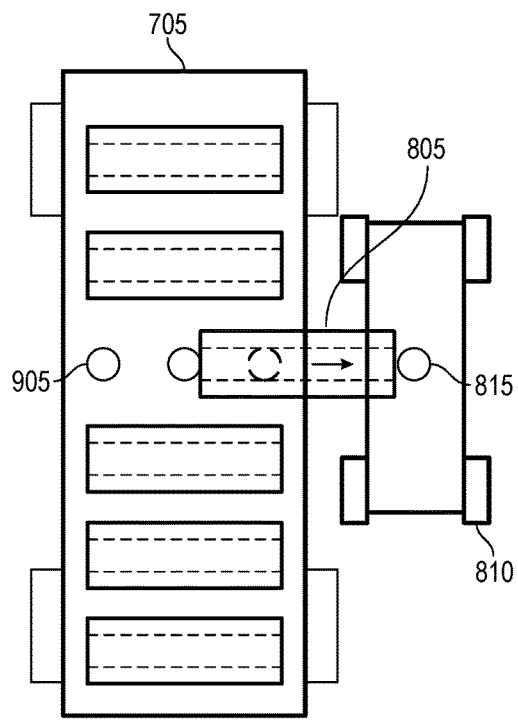
FIGS. 9-13 illustrate steps of utility pod exchanges from a pod transport vehicle to autonomous vehicles in accordance with an embodiment.

As shown in FIG. 9, the transport vehicle 705 may engage the edges of the channel edge (not shown in FIG. 9) of the utility pod 805 with one or more retractable pivot mechanisms 905 such that the utility pod 805 is laterally moved (inline with the direction of the length of the utility pod 805) to a position that allows engagement of a retractable pivot mechanism 815 of the AV frame 810.

Figure 10:
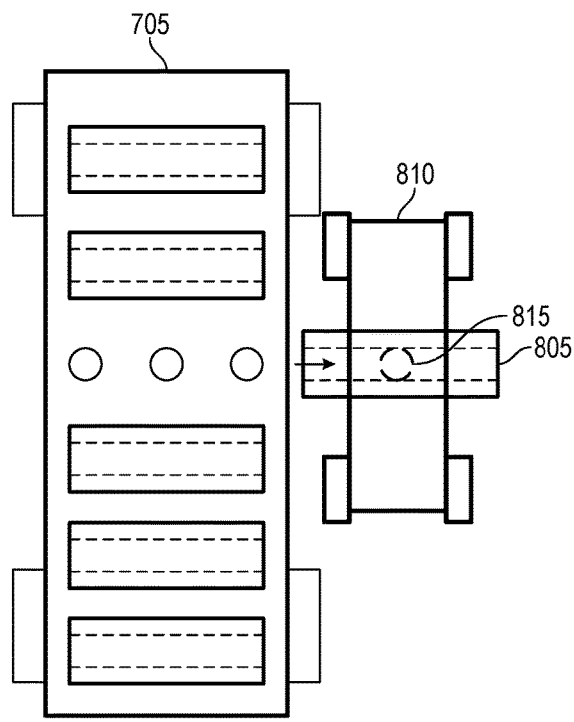

As shown in FIG. 10, once fully engaged in the conveyor channel of the utility pod 805, the utility pod may transfer from the transport vehicle 705 to the AV frame 810 until the utility pod 805 is axially aligned with the retractable pivot mechanism 815 at a lateral center point of the utility pod 805.

Figure 11:
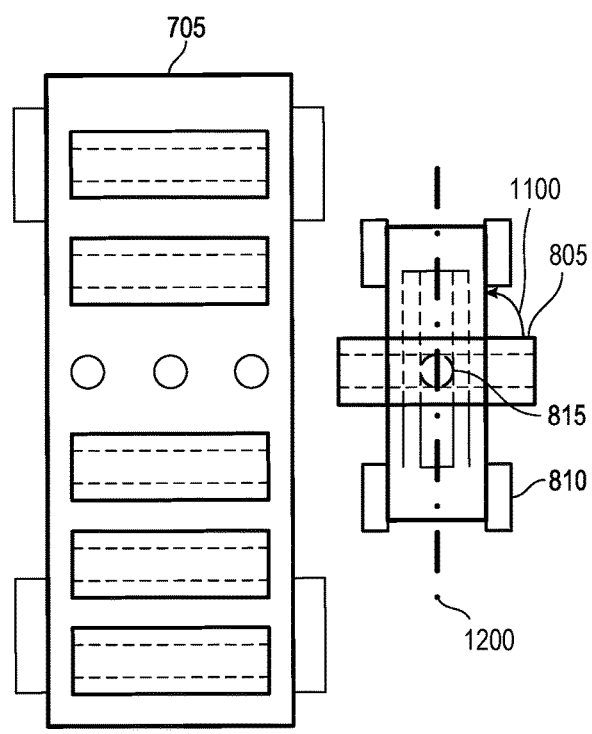

FIG. 11 depicts a rotational conveyance 1100 of the utility pod 805 that conveys the utility pod 805 using the retractable pivot mechanisms 815. More particularly, since the independently driven actuation members (e.g., the members 410 as shown in FIG. 4B) are driven independently, rotation of opposing actuation members disposed on opposite sides of the retractable pivot mechanism 815 may create rotational conveyance 1100 to linearly align the utility pod 805 to a longitudinal centerline 1200 of the vehicle frame 810.

Figure 12:
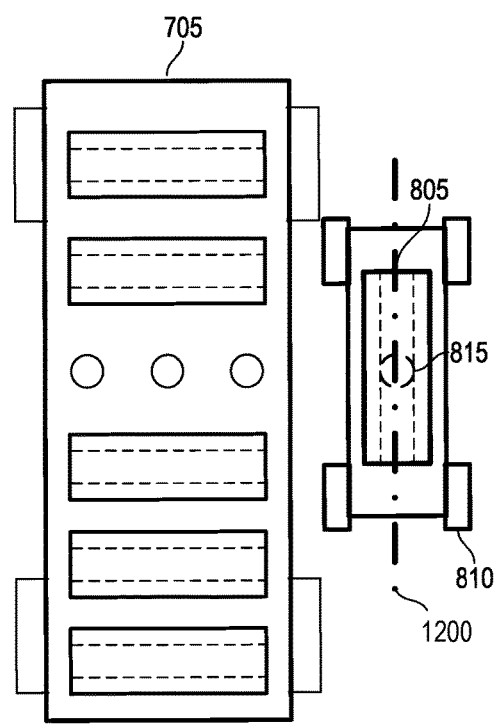

FIG. 12 depicts the utility pod 805 in an aligned position that provides linear alignment between the utility pod 805 and the AV frame 810. Accordingly, the AV frame 810 may engage locking mechanisms (not shown in FIG. 12) to rigidly fasten the utility pod 805 to the AV frame 810.

Figure 13:
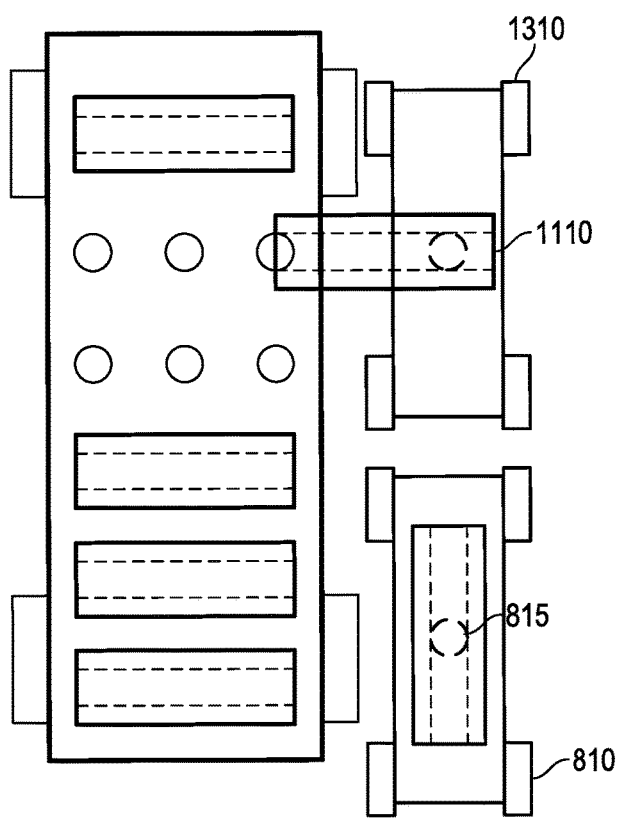

In one example embodiment, as depicted in FIG. 13, a plurality of utility pods including, for example, a second utility pod 1305, may be delivered to multiple AV frames in the field, such as a second AV frame 1310.

Figure 14:
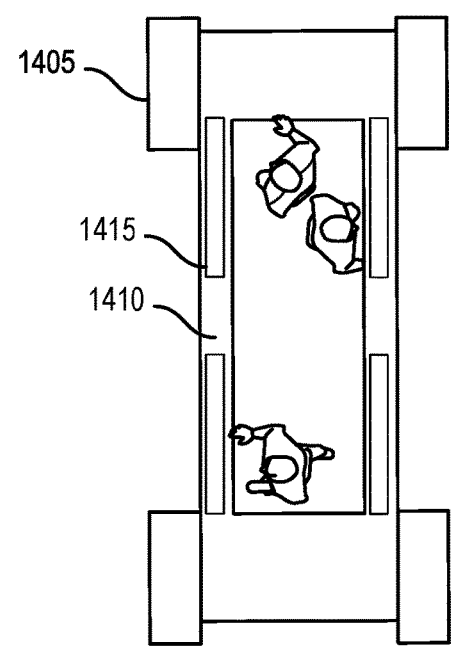
FIG. 14 depicts a human transportation utility pod carrying passengers in accordance with an embodiment.

FIG. 14 depicts an AV 1405 configured as a human transportation utility pod. The AV 1405 may include, in one example, an opening 1410 to an interior of a passenger cabin for passenger egress and ingress; and a plurality of moveable door rails 1415 configured to move to a blocked position that blocks the opening to the interior of the passenger cabin during passenger transportation, and to move to an unblocked position during passenger egress and ingress. The plurality of movable door rails 1415 are shown in FIG. 14 in a blocked position. In some embodiments, the AV 1405 may have the option to enclose its large ingress/egress opening for weather protection when needed.

Figure 15:
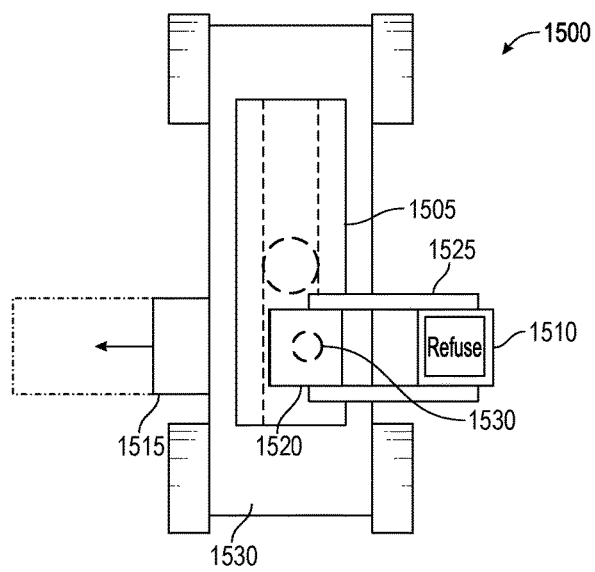
FIG. 15 depicts a utility pod configured for autonomously retrieving or exchanging a refuse bin while deploying a wheelchair ramp counterweight in accordance with an embodiment.

FIG. 15 depicts a utility pod 1505 configured for autonomously retrieving or depositing a refuse bin 1510 offboard the AV 1500 while deploying a counterweight 1515 that offsets the workload mass of the refuse bin 1510, in accordance with an embodiment. In another aspect of the present disclosure, the utility pod 1505 may include a work tool 1520 having a plurality of grabbing arms 1525. The work tool 1520 may be pivotably actuated at a pivot point 1530 such that the work tool 1520 may move objects rotationally onboard and offboard the AV 1500. The AV 1500 is narrow as compared to a conventional vehicle such that it may provide utility in areas that would otherwise be space-restricted, such as narrow alleyways or in other similar circumstances. Consequently, the AV 1500 may have a center of gravity between a narrow wheelbase such that lateral loads may render the AV off balance without deploying the counterweight 1515.

In one embodiment, the counterweight 1515 may deploy by extending from a pocket (not shown in FIG. 15) of the AV frame 1535 such that the counterweight 1515 offsets any workload forces associated with the work tool 1520 and the refuse bin 1510. For example, FIG. 15 depicts the counterweight 1515 extending laterally from a hidden pocket in the AV frame 1535.

Figure 16:
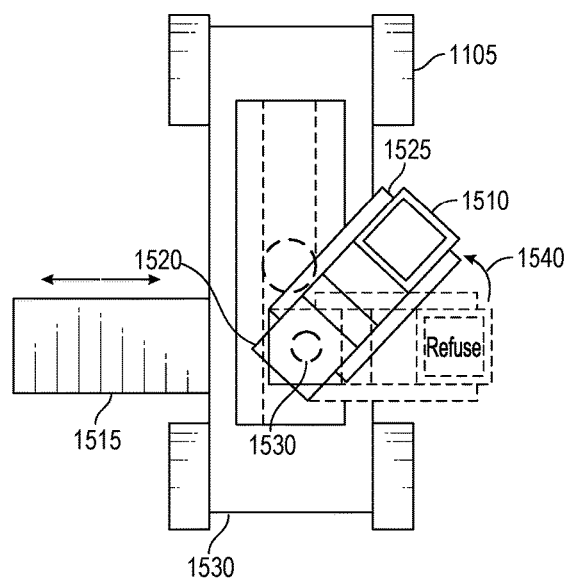
FIG. 16 depicts another step of the utility pod of FIG. 15 exchanging the refuse bin in accordance with an embodiment.

FIG. 16 depicts another step of the utility pod 1505 operating the work tool 1520, by fully extending the counterweight 1515 to accommodate the weight of the refuse bin 1510 as it is lifted by the grabbing arms 1525. In one aspect, the AV 1500 may extend and contract the counterweight 1515 responsive to receiving a signal from a sensor indicative of a vehicle balance with respect to a surface of the ground. For example, an inertial sensor (not shown in FIG. 16) may sense a movement indicative of an imbalance of the AV 1500 with respect to the ground, and extend the counterweight 1515 a commensurate distance to compensate for the sensed imbalance.

As the work tool 1520 rotates about the pivot point 1530 while holding the mass of the refuse bin 1510, the rotational conveyance 1540 may change a distribution of masses and may also change an overall balance of weight distribution to the wheels of the AV 1500. Accordingly, as the work tool 1520 rotates from a first position to a second position while holding the refuse bin 1510, the controller may extend or retract the counterweight 1515, in real time, or substantially real time, to compensate for the changing weight distribution as the work tool 1520 performs the operation at hand.

The counterweight 1515 may also serve multiple purposes, such as a wheelchair ramp that provides wheelchair access to the AV 1500 when configured as a passenger-carrying vehicle, and a loading ramp when the AV 1500 is configured as a cargo transportation vehicle. Other uses for such a ramp are possible, and such uses are contemplated.

Figure 17:
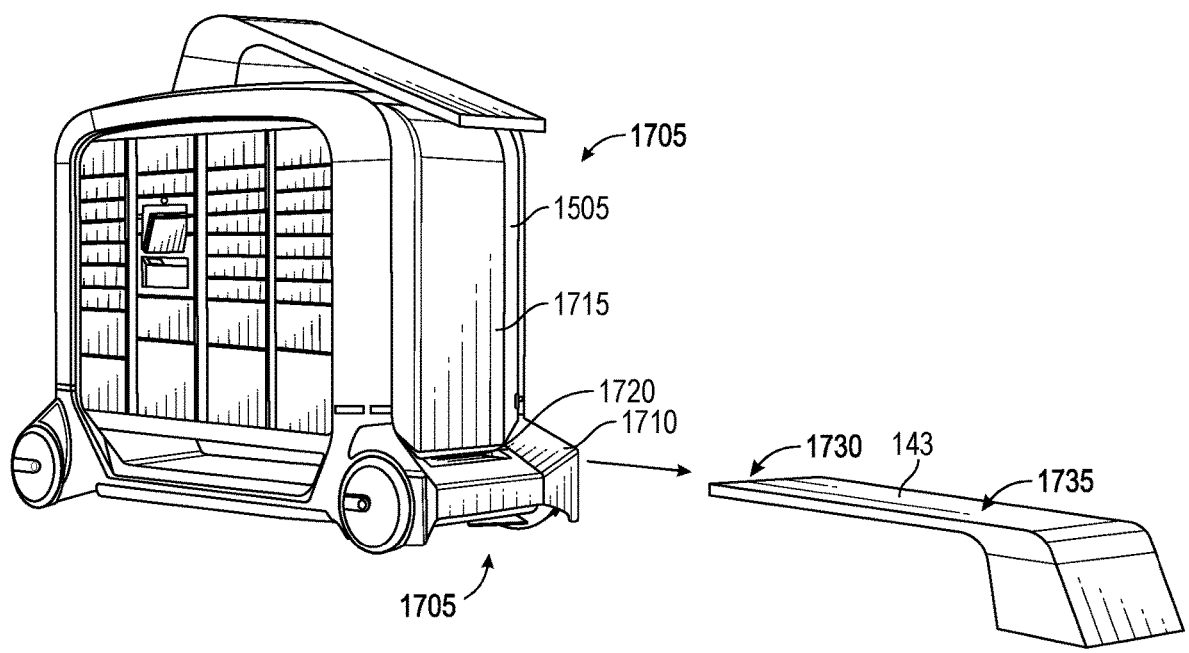
FIG. 17 illustrates an autonomous vehicle carrying a utility pod configured as a lockable storage locker, as the vehicle approaches a public fixture capsule stand in accordance with an embodiment.

FIG. 17 illustrates an autonomous vehicle carrying a utility pod configured as a lockable storage locker, as the vehicle approaches a public fixture capsule stand in accordance with an embodiment. The lockable storage locker (the removable storage pod 1715) may be substantially similar or identical to the utility pod 505 having lockable storage bins as described with respect to FIG. 5B.

Figure 18:
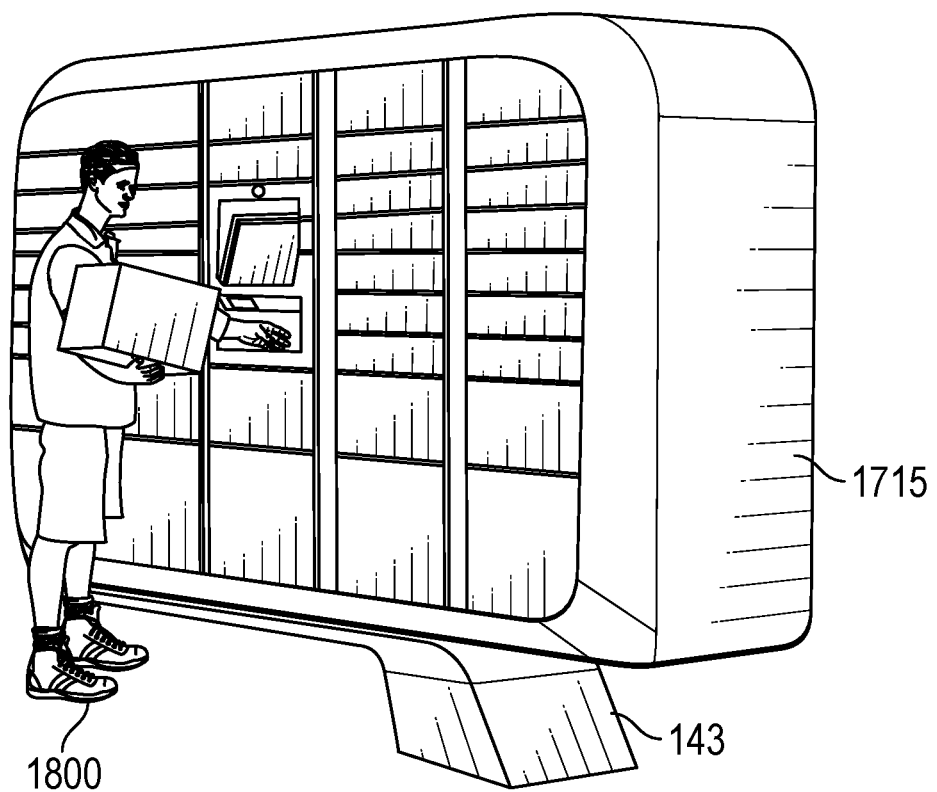
FIG. 18 illustrates the utility pod of FIG. 17 stationed on the public fixture capsule stand in accordance with an embodiment.

The present disclosure includes an AV 1705 that includes an AV frame 1710 configured with a removable utility pod 1715 configured as a storage locker in which online purchases or other items may be securely stored until retrieval by authorized users. The AV frame 1710 may transport the removable utility pod 1715 to a stationary location where the stationary fixture 143 is permanently installed for use as a docking station for the plurality of locked storage bins. In one embodiment, the AV 1705 may deliver the utility pod 1715, which may be loaded with items at a warehouse and delivered to a central item pickup site at which the stationary fixture 143 is installed. The AV 1705 can, in an example embodiment, deliver the removable utility pod 1715 by sensing a position of the stationary fixture 143 with respect to a docking port 1720 that may be configured as an opening at a proximal end 1725 of the AV 1705. The docking port 1720 may receive a distal end of the stationary fixture 143 such that the AV 1705 may engage a distal end 1730 of the stationary fixture such that the stationary fixture 143 is positioned in the docking port 1720, and the AV 1705 positions the utility pod 1715 atop a top surface 1735 of the stationary fixture. FIG. 18 illustrates the utility pod 1715 stationed on the stationary fixture 143 as a user 1800 retrieves a package from one of the lockable storage bins.

The capsule is loaded/unloaded by the following mechanism. There may be overhead rail, which functions as a hand rail for passengers and doubles as a guide rail for the capsules. When engaging with the public fixture for pickup and drop off, the interaction of the capsule to the fixture releases the downward force of the capsule to the guide rail. A locking pin holds the capsule in place as the vehicle moves into the fixture. When the capsule has reached the appropriate position the locking pin releases and the vehicle can back up, leaving the capsule on the public fixture. For pick up, the vehicle approaches and drives into the fixture, the capsule slides onto the guide rail, the locking pin engages and the capsule connects with the pickup vehicle. This significance of the mechanism is to limit the necessity for complex mechanism for the vehicle to engage with the capsule.

Figure 19:
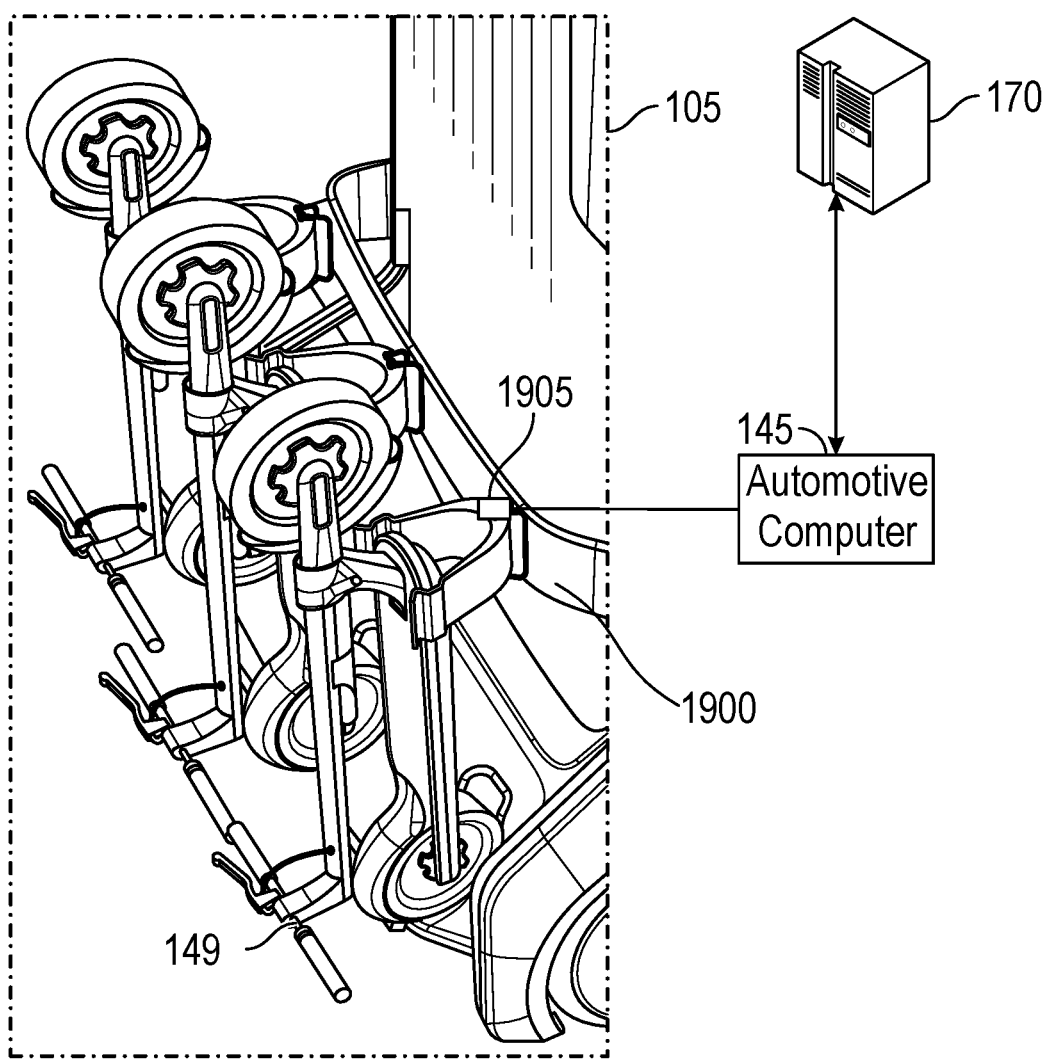
FIG. 19 is a view of a scooter deployment rack located on an end portion of an autonomous vehicle in accordance with an embodiment.

FIG. 19 is a view of a personal transport vehicle charging rack 1900 disposed on an exterior surface of an AV, as described in prior embodiments. For example, the personal transport vehicle deployment rack 1900 may be substantially similar or identical to the personal transport vehicle charging rack 147A and/or 147B, as described with respect to FIG. 1.

The Personal transport vehicle charging rack 1900 may rigidly hold and dispense personal transport vehicles, such as the scooters depicted with respect to FIG. 1. The personal transport vehicle 149 may operate as part of a personal transport vehicle fleet (e.g., the fleet 265 as described with respect to FIG. 2). In one example embodiment, the personal transport vehicle 149 may be an electric scooter that can be available for passengers as an additional service or as part of a rideshare subscription. For example, the user (e.g., the user 140 as shown in FIG. 1) may rent the personal transport vehicles 149 as they exit the AV, when it is configured as personal transport. In an aspect of the present disclosure, the user 140 may submit a request to dispense the personal transportation vehicle, and use the application 135 on the mobile device 120 to authenticate and authorize a personal use of the personal transport vehicle 149. Accordingly, the server(s) 170 may provide a rideshare platform (not shown in FIG. 1) that provides access to the personal transport vehicle 149 after user authentication by transmitting a message to the automotive computer 145 that causes the personal transport vehicle charging rack 147A to disengage a locking mechanism 1905 that releases the personal transport vehicle 149 from the AV 105 based on the request to dispense the personal transportation vehicle. The disengaging can allow the personal transportation vehicle to separate from the auxiliary charging rack for personal use as the user 140 continues their journey.

The AV 105 may dispense and/or otherwise store the personal transport vehicle(s) 149 on an exterior dispensing/charging rack 1900, which may be rigidly attachable to an exterior surface of the AV 105. The passengers (e.g., user 140) may exit the AV 105, request access to one or more of the personal transport vehicles 149 using the mobile device application 135 (described in FIG. 1) or via other means for authenticating their access (e.g., via a user interface or other means not shown in FIG. 1). The AV 105 (or alternatively, the charging rack 1900, when configured as an interface) may cause the personal transport vehicle charging rack 1900 to release a personal transport vehicle 149, which may be foldable or otherwise made compact for multiple device storage. Accordingly, an authenticated user may continue on the next leg of their journey independently using the personal transport vehicle 149.

Figure 20:
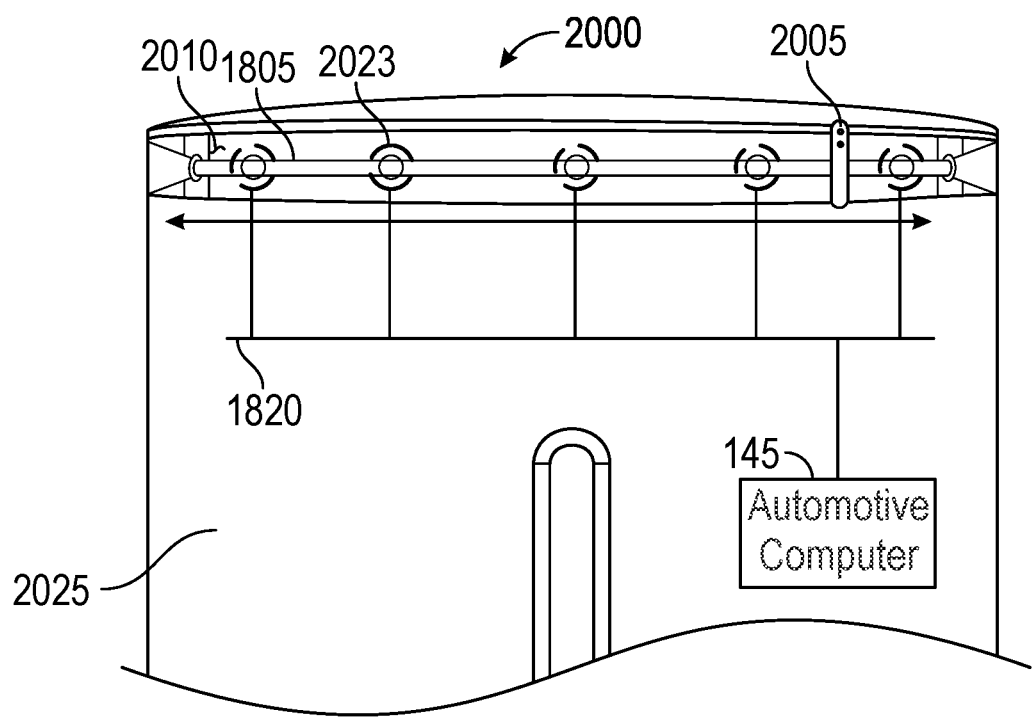
FIG. 20 depicts a view of a sensor array wiper mechanism for use in embodiments described in accordance with the present disclosure.

FIG. 20 depicts a view of a sensor array wiper system 2000 comprising a wiping member 2005 that wipes moisture and debris from an outside surface 2010 of sensor bank protection layer 2015, according to an embodiment. In one aspect, a sensor bank 2020 may include a plurality of sensors disposed around a periphery of a utility pod 2025. The utility pod 2025 may be substantially similar or identical to the utility pod 107, 505, 805, and others described herein.

In one aspect, the sensor array wiper system 2000 may include a sensor bank protection layer 2015 having an inside surface (in which the sensors 2023 of the sensor bank 2020 are disposed) and an outside surface 2010, which may be exposed to outside dirt, weather, and other elements. The sensor bank protection layer 2015 may be constructed of a signal permeable membrane separating the plurality of sensors 2023 from the outside elements. The wiping member 2005 may be disposed on an outside surface of the sensor bank protection layer 2015, and rigidly disposed with an actuation member and held in movable contact with the outside surface of the sensor bank protection layer 2015. A drive mechanism (not shown in FIG. 20) may be configured to convey the wiping member along the outside surface of sensor bank protection layer 2015 such that the wiping member 2005 wipes any debris and moisture from the outside surface of the sensor bank protection layer 2010.

The sensor array wiper system extends around a periphery of the utility pod 2025 such that the sensor array wiping member 2005 may circle the utility pod 2025 and clean the sensor bank 2020 from any impediments to sensor functionality. A data bus 2035 may be disposed in communication with the sensors 2023 of the sensor bank 2020 and the automotive computer 145.

Figure 21:
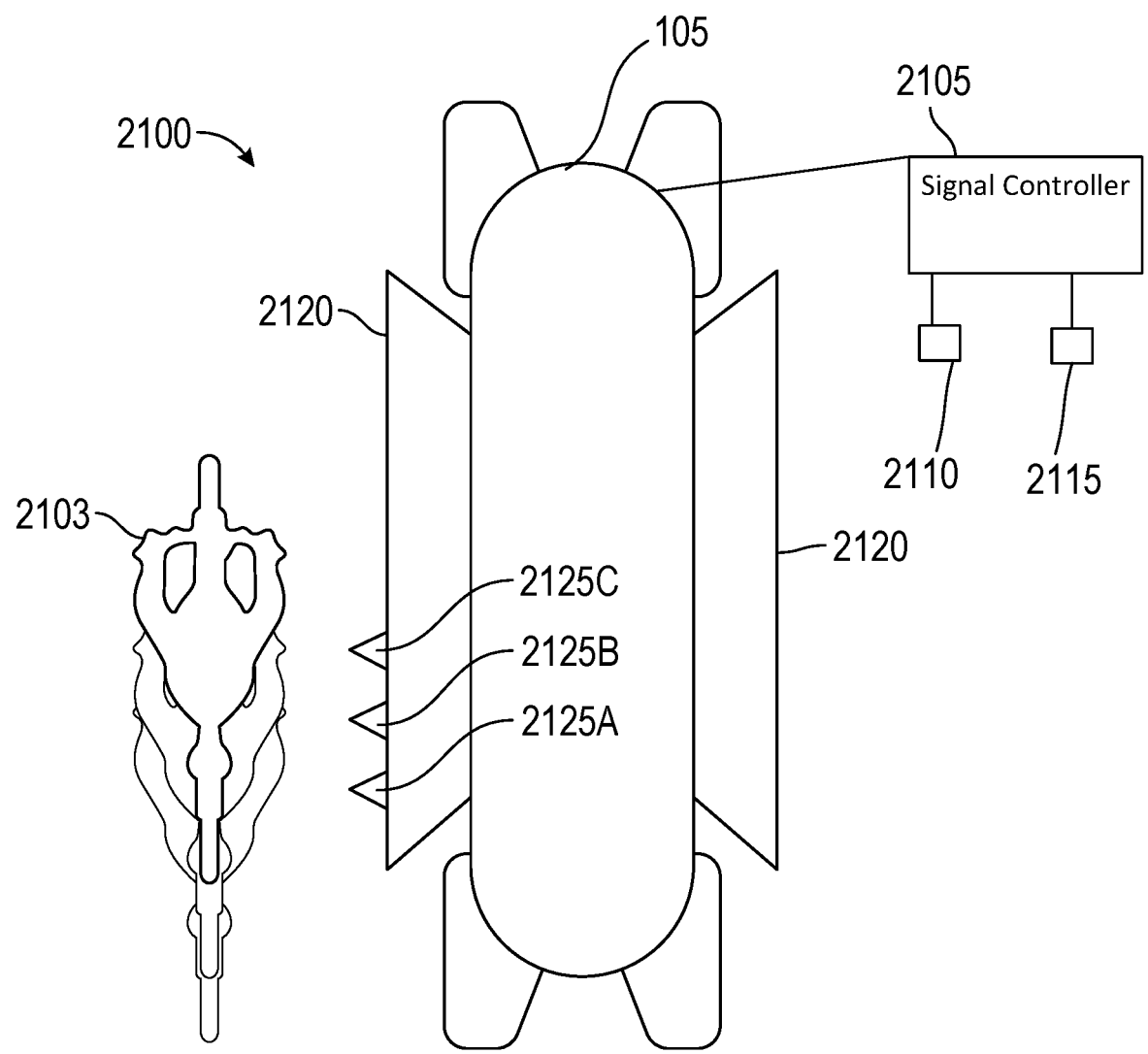
FIG. 21 illustrates a bicyclist approaching a side of an autonomous vehicle configured with an automated pedestrian signaling system in accordance with an embodiment.

In another example embodiment, the present disclosure describes features associated with the AVs and utility pods that provide visual indications to pedestrians, bicyclists and other individuals, that can signal an acknowledgement by the AV that the vehicle sees or senses the pedestrian or bicyclist. FIG. 21 illustrates one such example person 2103, depicted as a bicyclist approaching a side of the AV 105, which may be configured with an automated pedestrian signaling system 2100, in accordance with an embodiment.

The automated pedestrian signaling system 2100 may include a signal controller 2105 disposed in communication with a plurality of proximity sensors 2110, and a light signal generation module 2115. The signaling system 2100 is disposed in communication with the automotive computer 145 (not shown in FIG. 21), and the object collision avoidance system 210 as described with respect to FIG. 2. Accordingly, the proximity sensors 2110 may be substantially similar or identical to the proximity sensor(s) 235 described with respect to FIG. 2.

In the example embodiment of FIG. 21, as the pedestrian 2103 approaches a lateral side of the AV 105 the signaling system 2100 may generate an instruction to a light generation module (not shown in FIG. 21) to output light signal markings 2120 on a pavement surface surrounding the AV 105. The light signal markings 2120 may provide a visual indication that the AV 105 is aware of the bicyclist 2103 as it approaches the AV 105.

In one example embodiment, the visual indication may be a light-generated arrow marker 2125 that is animated by the signal controller 2105 to follow the moving position of the bicyclist 2103. Accordingly, in one aspect, the proximity sensor(s) 2110 may alert the signal controller 2105, and/or the mobility control module 205 (as described with respect to FIG. 2) to the presence of sensed obstacles, and provide trajectory information to the mobility control module 205, where the trajectory information is indicative of moving objects or people that may interact with the AV 105. The trajectory information may include one or more of a relative distance, a trajectory, a speed, a size approximation, a weight approximation, and/or other information that may indicate physical characteristics of a physical object or person. Accordingly, such information may inform the signal controller 2105 of where to project the light generated arrow marking, and how to animate such markings so that they follow the position of the bicyclist 2103. The mobility control module 205 may be configured to aggregate information from navigation receiver(s) 240 (described in FIG. 2), such as current position and speed of the AV 105, along with sensed obstacles (e.g., the bicyclist 2103) from the proximity sensor(s) 235/2110, and interpret the aggregated information to compute a safe path towards a destination such that the AV 105 avoids collisions.

Sensed obstacles can include, for example, other vehicles, pedestrians, bicyclists, animals, structures, curbs, and other random objects. In some implementations the proximity sensor(s) 235 may be configured to determine the lateral dimensions of the path upon which the AV 105 is traveling, e.g., determining relative distance from the side of a sidewalk or curb, to aid the mobility control module 205 in maintaining precise navigation on a particular path, and project the light generated arrow marking according to the relative distances. In one example embodiment, the AV 105 may sense the bicyclist 2103, determine a changing proximity of the bicyclist 2103 as it changes with time, and project the markings 2125A, 2125B, and 2125C to follow the position of the bicyclist 2103. The light markings may provide the visual cues using the light signal generation module 2115, which may include one or more light-emitting projectors (e.g., a laser projector or other projection device configured to generate an animated projection) configured to shine the animated light signals onto the pavement surfaces such that the bicyclist 2103 has a visual indication that the AV 105 is aware of its presence as the bicyclist approaches the AV 105 and attempts to pass the vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An autonomous vehicle comprising:
   an autonomously driven vehicle frame comprising a retractable pivot mechanism disposed on a platform surface of the vehicle frame;
   a removable utility pod configured to convey to and from the vehicle frame by way of the retractable pivot mechanism;
   a processor configured to provide autonomous vehicle operation; and
   a memory for storing executable instructions, the processor configured to execute the instructions to:
      extend the retractable pivot mechanism from a retracted position recessed in the platform surface of the vehicle frame to an extended position;
      engage a conveyor channel of the removable utility pod via the retractable pivot mechanism to engage a conveyor channel disposed on a mating surface of a utility pod;
      convey the utility pod, along the conveyor channel, from a distal end to a center position of the utility pod to linearly align the utility pod to a longitudinal centerline of the vehicle frame; and
      lock the utility pod to the vehicle frame to a linearly aligned position along the longitudinal centerline of the vehicle frame via engagement of a lock mechanism.

2. The autonomous vehicle according to claim 1, wherein the retractable pivot mechanism comprises a plurality of independently driven actuation members annularly disposed on an edge surface of the retractable pivot mechanism.

3. The autonomous vehicle according to claim 2, wherein the plurality of independently driven actuation members is configured to engage a drive channel disposed on a mating surface of a utility pod, wherein the retractable pivot mechanism is configured to convey the utility pod along the drive channel using at least two actuation members of the plurality of independently driven actuation members, the conveying comprising, with respect to the retractable pivot mechanism, a combination of rotational and linear movement.

4. The autonomous vehicle according to claim 1, wherein the utility pod comprises a battery bank for powering a traction motor of the autonomous vehicle.

5. The autonomous vehicle according to claim 1, wherein the utility pod comprises a passenger cabin comprising:
   an opening to an interior of the utility pod for passenger egress and ingress; and
   a plurality of moveable door rails configured to move into a blocked position that blocks the opening outward from the interior of the passenger cabin during passenger transportation, and to move to an unblocked position during passenger egress and ingress while the utility pod is in a stationary position.

6. The autonomous vehicle according to claim 5, wherein the utility pod comprises an auxiliary exterior transport charging rack configured to:
   engage a locking mechanism that rigidly secures a personal transportation vehicle to the auxiliary transport charging rack;
   receive, via a wireless channel, a signal indicative of a request to dispense the personal transportation vehicle to a user; and
   disengage the locking mechanism based on the request to dispense the personal transportation vehicle, wherein the disengaging allows the personal transportation vehicle to separate from the auxiliary charging rack.

7. The autonomous vehicle according to claim 6, wherein the auxiliary transport charging rack is configured to:
   disengage from the stationary utility pod;
   transfer to a charging rack fixture offboard the autonomous vehicle; and
   engage a locking mechanism that locks the auxiliary transport charging rack to a charging rack fixture installed offboard the vehicle.

8. The autonomous vehicle according to claim 1, wherein the utility pod comprises:
   a plurality of lockable storage bins configured to engage a stationary docking point installed in a stationary position offboard the autonomous vehicle; and
   a storage bin controller comprising a processor configured to:
      connect with a remote server of a package delivery platform;
      receive user input associated with a user account authenticated to lock or unlock a bin of the plurality of lockable storage bins;
      authenticate the user input by way of the remote server;
      receive, from the remote server, an instruction indicative of an access authorization responsive to the authentication of the user input; and
      lock or unlock a locking mechanism based on the instruction, wherein the locking and unlocking provides access to an interior of a storage bin of the plurality of lockable storage bins based on the authenticated user input.

9. The autonomous vehicle according to claim 8, wherein the stationary docking point is configurable as a bench seat fixture when the utility pod is not engaged with the stationary docking station.

10. The autonomous vehicle according to claim 1, wherein the utility pod comprises a work tool and a work tool controller configured to:
   identify a target object at a proximal side offboard the autonomous vehicle;
   retrieve the target object using a work tool arm comprising opposing grabbing members by holding opposing sides of the target object with the opposing grabbing members;
   extend a counterweight platform on a distal side of the autonomous vehicle, the distal side disposed on an opposite side of the proximal side of the autonomous vehicle;
   lift the target object while extending the counterweight in an approximately equal opposite distribution of mass with respect to a longitudinal centerline of the autonomous vehicle; and
   place the target object on a platform surface disposed on an interior surface of the utility pod.

11. The autonomous vehicle according to claim 10, wherein the counterweight platform is movably disposed in an interior pocket of the autonomously driven vehicle frame.

12. The autonomous vehicle according to claim 11, wherein the counterweight platform is configurable as a wheelchair access ramp that provides wheelchair access to the interior surface of the utility pod.

13. The autonomous vehicle according to claim 1, wherein the utility pod comprises:
   a sensor bank having a plurality of sensors disposed around a periphery of the utility pod;
   a sensor bank protection layer having an inside surface and an outside surface, the sensor bank protection layer comprising a signal permeable membrane separating the plurality of sensors proximate the inside surface and an area outside of the sensor bank;
   a wiping member disposed on an outside surface of the sensor bank protection layer; and
   a drive mechanism configured to convey the wiping member along the outside surface of the sensor bank protection layer such that the wiping member wipes debris and moisture from the outside surface.

14. A computer-implemented method, comprising:
   navigating, via a processor, an autonomously driven vehicle frame comprising a retractable pivot mechanism disposed on a platform surface of the vehicle frame;
   extending the retractable pivot mechanism from a retracted position recessed in the platform surface of an autonomously driven vehicle frame to an extended position;
   engaging a conveyor channel of a utility pod via the retractable pivot mechanism to engage a conveyor channel disposed on a mating surface of a utility pod;
   conveying the utility pod, along the conveyor channel, from a distal end to a center position of the utility pod to linearly align the utility pod to a longitudinal centerline of the vehicle frame; and
   locking the utility pod to the vehicle frame to a linearly aligned position along the longitudinal centerline of the vehicle frame via engagement of a lock mechanism.

15. The computer-implemented method according to claim 14, comprising independently actuating a plurality of independently actuated actuation members annularly disposed on an edge surface of the retractable pivot mechanism.

16. The computer-implemented method according to claim 15, the method further comprising:
   engaging, via the plurality of independently driven actuation members annularly disposed on the edge surface of the retractable pivot mechanism, a drive channel disposed on a mating surface of a utility pod;
   conveying the utility pod along the drive channel using at least two actuation members of the plurality of actuation members;
   wherein the conveying comprises conveying the utility pod linearly, with respect to the retractable pivot mechanism;
   conveying the utility pod rotationally with respect to the retractable pivot mechanism; and
   conveying the utility pod with a combination of rotational and linear movement with respect to the retractable pivot mechanism.

17. The computer-implemented method according to claim 15, the method further comprising:
   providing power to the autonomously driven vehicle frame by installing a charged battery bank integrated with the utility pod.

18. The computer-implemented method according to claim 15, the method further comprising:
   engaging a locking mechanism of an auxiliary transport charging rack that rigidly secures a personal transportation vehicle to the exterior auxiliary transport charging rack;
   receiving, via a wireless channel, a signal indicative of a request to dispense the personal transportation vehicle; and
   disengaging the locking mechanism based on the request to dispense the personal transportation vehicle, wherein the disengaging allows the personal transportation vehicle to separate from the auxiliary charging rack.

19. The computer-implemented method according to claim 18, further comprising:
   disengaging the transport charging rack from the stationary utility pod;
   transferring the auxiliary transport charging rack to a charging rack fixture offboard the autonomous vehicle; and
   engaging a locking mechanism on the transport charging rack that locks the auxiliary transport charging rack to a charging rack fixture installed offboard the vehicle.

20. A non-transitory computer-readable storage medium in a vehicle control module, the computer-readable storage medium having instructions stored thereupon which, when executed by a processor, cause the processor to:
   extend a retractable pivot mechanism from a retracted position recessed within a platform surface of the vehicle frame to an extended position;
   engage a conveyor channel of a utility pod via the retractable pivot mechanism to engage a conveyor channel disposed on a mating surface of a utility pod;
   convey the utility pod, along the conveyor channel, from the distal end of the utility pod to a center position of the utility pod to linearly align the utility pod to a longitudinal centerline of the vehicle frame; and
   lock the utility pod to the vehicle frame to a linearly aligned position along the longitudinal centerline of the vehicle frame by via engagement of a lock mechanism.

* * * * *